UNITED STATES PATENT OFFICE.

CARL BERGQUIST, OF PHILADELPHIA, PENNSYLVANIA, ASSIGNOR TO F. W. TUNNELL & CO., INC., OF PHILADELPHIA, PENNSYLVANIA, A CORPORATION OF PENNSYLVANIA.

VEGETABLE GLUE OR ADHESIVE.

1,287,841.  Specification of Letters Patent. Patented Dec. 17, 1918.

No Drawing.   Application filed December 15, 1917.  Serial No. 207,260.

*To all whom it may concern:*

Be it known that I, CARL BERGQUIST, a citizen of Sweden, and a resident of Philadelphia, in the county of Philadelphia and State of Pennsylvania, have invented a new and Improved Vegetable Glue or Adhesive, of which the following is a full, clear, and exact description.

My composition belongs to that large class of adhesives of vegetable origin produced from starch which has been modified or hydrolyzed.

An object of the invention is to provide an improved adhesive forming a thick smooth paste which on drying gives a clear film in place of the usual dull opaque flakes.

Another object of the invention is to so treat the starch as to increase its viscous consistency and also to produce in drying a transparent clear film.

I obtain the desired gelatinization of the starch by treating the same with formaldehyde and an ammonium compound. I am well aware that starch has been previously treated with formaldehyde and ammonium compounds but the resulting starch was an insoluble or nongelatinous starch. (See United States Patent No. 982,673). The reason is that the amount of formaldehyde and ammonium compound used was considerably larger than what I introduce into the starch. In my treatment of the starch, the quantity of formaldehyde and ammonium compound together should not exceed $2\frac{1}{2}\%$ by weight that of the starch used.

Neither the formaldehyde alone nor the ammonium compound alone will produce the desired change in the starch. The presence of both is necessary. I attribute this to the formation of hexamethylene-tetramin which acts or unites with the starch to produce a readily gelatinizing starch characterized by a clear film. An excess of either does not interfere as it is lost in the process of hydrolysis.

The manner of treatment may be as follows: Starch is treated in the well known way with an acid to make a thin boiling, that is, partly hydrolyzed. Usually such hydrolyzed starch is either a thin paste or a jelly not having a thick viscous consistency. I then add a small quantity of formaldehyde and an ammonium compound which reacts with the partially hydrolyzed starch as the mixture is further hydrolyzed and gives to it the desired consistency.

The following is an example: 190 grams of corn starch, 225 c. c.'s of water, 0.3 gram ammonium chlorid, 0.65 gram formaldehyde of 40 per cent. strength, and 0.5 of c. c. hydrochloric acid 23° Bé., are mixed and stirred for one-half hour; the mixture filtered and dried, first at low temperature, then increasing the temperature to about 170° F., where the mixture is kept until the desired viscosity is obtained. The resulting starch in its dry state has the appearance of ordinary starch, but on being hydrolyzed, it produces a film which is clear and bright on drying.

I claim:

1. The process of making adhesive from starch compound which consists in treating hydrolyzed starch or its derivative with formaldehyde and an ammonium compound adapted to form hexamethylene-tetramin, the quantity of which does not exceed $2\frac{1}{2}\%$ of the quantity of starch by weight.

2. The process of making adhesive from starch compounds which consists in treating the starch with an acid to make it thin boiling, and adding formaldehyde and ammonium compound which are adapted to form hexamethylene-tetramin, the quantity of which by weight does not exceed $2\frac{1}{2}\%$ of the quantity of starch used.

3. An adhesive resulting from starch and hexamethylene-tetramin, and being characterized by producing a gelatinizing starch adapted to give a clear film in drying.

4. An adhesive resulting from starch and formaldehyde and an ammonium compound and characterized by its property of gelatinizing, and producing in drying a clear film.

5. An adhesive resulting from hydrolyzed starch and formaldehyde and an ammonium compound, and characterized by its property to gelatinize and produce on drying a clear film.

6. An adhesive resulting from hydrolyzed starch, formaldehyde and ammonium compound, the quantity of formaldehyde and ammonium compound not exceeding 2½% by weight of the starch used.

7. The process of making adhesive from starch compounds which consists in hydrolyzing the starch and then treating the hydrolyzed starch with hexamethylene-tetramin.

8. The process of making adhesive from starch compounds which consists in hydrolyzing the starch, then treating the hydrolyzed starch with formaldehyde and an ammonium compound.

CARL BERGQUIST.